April 21, 1959     C. D. GILMORE     2,882,838
DIE ATTACHMENTS FOR DOUGHNUT MAKING MACHINES
Filed July 10, 1956
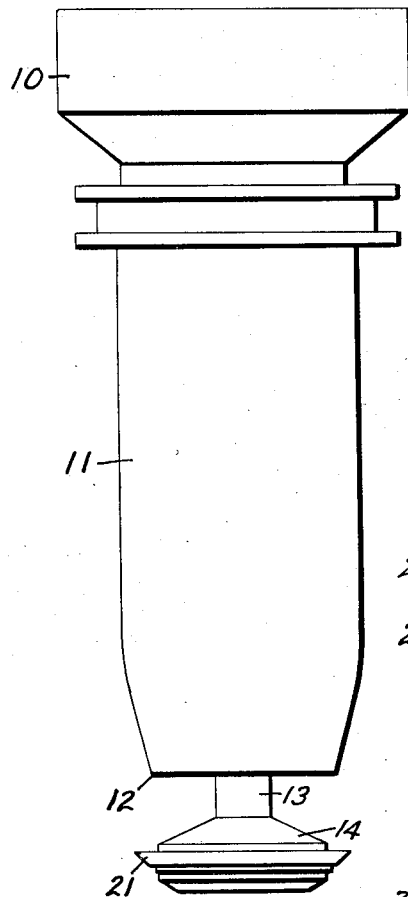
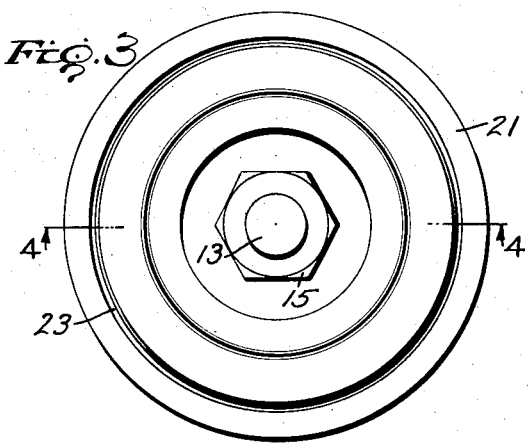
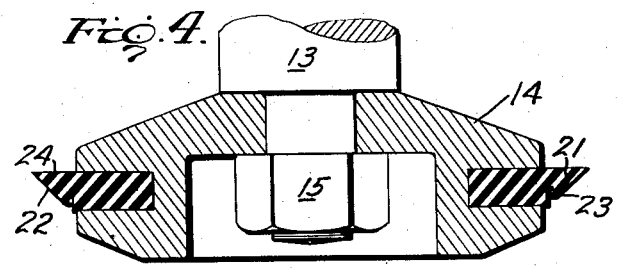
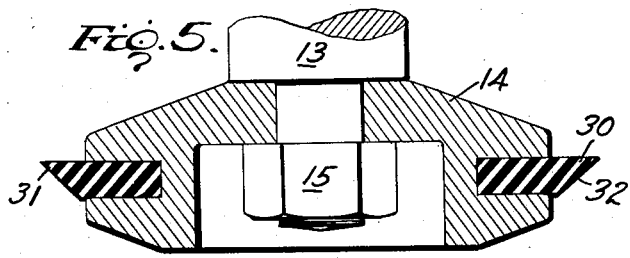
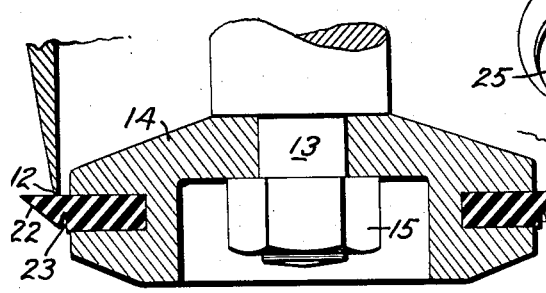
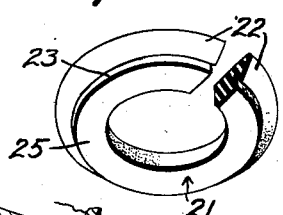
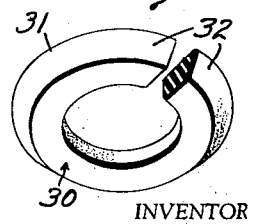
INVENTOR
Chace D. Gilmore

United States Patent Office 2,882,838
Patented Apr. 21, 1959

2,882,838

DIE ATTACHMENTS FOR DOUGHNUT MAKING MACHINES

Chace D. Gilmore, West Chester, Pa.

Application July 10, 1956, Serial No. 596,938

7 Claims. (Cl. 107—14)

This invention relates to improvements in dies for doughnut-making machines of the type shown in the Bergner Patent No. 1,492,542. In these machines, a tubular sleeve with a circular cutting edge on its lower end is moved by power up and down over a dough-delivering tube and cooperates with a fixed circular disk carried by said tube to form the dough shape and sever it from the mass of dough forced down through the tube. There are many thousands of machines of this type in use today in this country. All of them work satisfactorily when the parts are in perfect adjustment and the materials worked with are just right, but after awhile operating difficulties arise. The sliding metal parts wear or are damaged by careless operators and then trouble begins, being evidenced, for example, by stringing or dripping of the dough. Sometimes these dough strings hold the dough shape upon the end of the die tube; meanwhile, another dough shape is formed by the automatic machine, adding to the difficulties. Nearly always the strings and gobs of dough fall into the hot liquid fat, where they quickly fry to blackness, which darkens all the fat and in time makes it unusable so that the machine must be shut down, and the fat must then be filtered or else thrown away. To restore his machine to good working order, the machine owner must return the entire die assembly to the factory for reconditioning, which is expensive, besides stopping production until a new or reconditioned die assembly is put on the machine.

By my improvement, the return of an entire die assembly to the factory should never be necessary, because I provide an elastomeric resilient ring on the disk which takes all of the wear of the cutting edge of the cutter sleeve and which keeps that edge clean and compensates, as it were, for any damage or nicks which the cutting edge may receive. This elastomeric ring also helps the dough shape to separate from the die, and actually gives the doughnut a better appearance (the hole being of more even contour) as has been proved in actual commercial production of thousands of doughnuts. This elastomeric ring is easily removed by hand for cleansing or replacement when worn, and this removal is possible without dismounting the die assembly. The cost of replacing a single elastomeric ring is an extremely small fraction of the cost of reconditioning a die assembly; besides which there is an immense saving in time, and production time naturally means money. The total potential savings made possible by use of my invention on machines of the character indicated will be very large indeed, these savings being realizable by the machine owners or leasors, who are often operating on a close margin.

In the accompanying drawings showing two embodiments of the invention:

Fig. 1 is a somewhat diagrammatic elevation of a die assembly for doughnut-making machines with one of my elastomeric rings attached to the valve disk;

Fig. 2 is a sectional elevation showing how the ring of Figs. 4 and 6 co-operates with the cutting edge;

Fig. 3 is a sectional plan view showing the ring of either Fig. 4 or Fig. 5;

Fig. 4 is a diametral section on line 4—4 of Fig. 3;

Fig. 5 is a diametral section on line 5—5 of Fig. 3;

Fig. 6 is a perspective view, with a part broken away, of the ring shown in Figs. 1, 2 and 4; and Fig. 7 is a perspective view, with a part broken away, of the ring shown in Figs. 3 and 5.

Referring particularly to the drawings, the die assembly partially shown comprises a die tube 10 which receives doughnut dough (not shown) from a container (not shown), the dough being forced downwardly by air pressure or by a heavy follower, a sleeve 11 which slides up and down on the die tube responsive to a power-driven yoke (not shown), said sleeve having a circular cutting edge 12 at its lower end for cutting off the dough, a fixed stem 13 secured axially of the die tube, and a disk 14 removably secured to the lower end of the stem by means of a nut 15 threaded on the extremity of the stem.

In accordance with my present invention, the valve disk 14 has a narrow annular groove 20 cut in its periphery, and a Buna rubber or neoprene (or similar tough elastomer) ring 21 is held in said groove by the resilience of the ring, being snapped in place or removed by the fingers of the operator. Beyond the periphery of the valve disk the ring is given a flexible lip by means of a beveled surface 22 which faces downwardly. Between the beveled surface 22 and the main body of the ring, a narrow annular slot 23 is formed, said slot having one wall which is parallel to the axis of stem 13 and another wall which is at an acute angle to the first mentioned wall, as clearly shown. Slot 23 has its opening or mouth at the bottom of the ring and has a depth of slightly more than half the thickness of ring 21, and it is just outside the periphery of disk 14, when the ring is in normal or operating position. Ring 21 may have an inside diameter of one inch, an outside diameter of one and three-fourths of an inch, and flat surfaces 24, 25 on opposite sides that are one-fourth of an inch wide to fit in a one-fourth inch deep groove 20. All these dimensions are illustrative.

The other form of ring is shown at 30 in Figs. 3, 5 and 7, and is distinguished by having no slot like slot 23, but it has a flexible lip 31 provided by a beveled surface 32 and it fits in groove 20 in exactly the same way. Obviously lip 31 will have less flexibility than the slotted lip provided on ring 21.

Both forms of ring extend out beyond the inside diameter of sleeve 11 and rub over the cutting edge 12 of said sleeve. This causes a wiping of the knife edge. See Fig. 2. As the sleeve lowers, the flexible lip of either form of ring folds a little, umbrella fashion, and the lip pulls away from the dough with a snap action. This helps the dough shape to separate from the die, and it gives the doughnuts a better appearance, since the holes are more uniform. The wiping action mentioned above is of great importance, as stringing is obviated, and a clean separation of the dough from the die is assured, until the ring finally wears out and must be replaced. (As previously stated, replacement is a simple hand operation requiring scarcely any time.)

The present invention is believed to be desirable because no plastic flow of the ring by compression is resorted to, and the present rings are simple to form. The flexible lips with their wiping action have been found to give surprising results. In actual tests, a battered sleeve with nicks in its cutting edge, when assembled with the described rings, formed perfect doughnuts without stringing or other operating difficulties, due to the constant wiping action of the flexible lips. Also the doughnut shapes are more uniform and the cooked doughnuts are less greasy.

Having described two forms of rings, without being limited thereto, what I claim as new and desire to secure by Letters Patent is:

1. In a doughnut-machine die assembly, the combination of a die tube for passage of the doughnut dough; a stem fixed centrally of the die tube and extending below its lower end; a disk fixed to the lower end of the stem; a reciprocable sleeve with a cutting edge on its lower end movable over the die tube; and an elastomeric ring held on the periphery of said disk so as to be readily removable by hand, said ring having a very flexible outer lip which is of such dimensions and is so positioned that it engages the cutting edge and wipes said edge clean and also engages and wipes the inside of the sleeve each time said sleeve moves down over the disk to cut off a doughnut dough shape and moves back again.

2. In a doughnut-machine die assembly, the combination of a die tube for passage of the doughnut dough; a stem fixed centrally of the die tube and extending below its lower end; a circular disk fixed to the lower end of the stem; a reciprocable sleeve with a circular cutting edge on its lower end movable over the die tube; said disk having an annular groove therein extending inwardly from its circular periphery at right angles to the axis of said stem; and an elastomeric ring held in said groove by its own resilience, said ring having a very flexible outer lip which projects beyond said circular periphery and which also projects beyond the outer edge of said cutting edge, said ring being of such dimensions and being so positioned that it engages the cutting edge and wipes it clean and also wipes the inside of the sleeve each time said sleeve moves down over the disk to cut off a doughnut dough shape and moves back again.

3. The invention according to claim 2, wherein the flexible outer lip of said ring has a circular groove in it adjacent to but outside of the periphery of said disk, said circular ring groove being widest at its mouth, which is on the under side of the ring, and tapering inwardly and having a depth of about half the thickness of the ring, said circular ring groove being co-axial with the disk and the stem.

4. The invention according to claim 3, wherein the flexible outer lip of said ring also has a beveled surface forming an edge which is in the same plane with the uppermost surface of the groove-seated ring.

5. The invention according to claim 2, wherein the flexible outer lip of said ring is formed by a beveled surface extending from the periphery of the disk to an edge which lies in the same plane as the uppermost surface of the groove-seated ring.

6. An elastomeric ring for use with disks of doughnut die assemblies consisting of a unitary annulus having flat upper and lower surfaces, a flexible lip formed by a beveled peripheral surface extending from the outer edge of the upper flat surface to the outer edge of the lower flat surface, the inner periphery of the annulus being cylindrical to fit a groove cut in the disk which carries the ring, the ring also being provided with a circular groove adjacent to the outer edge of the lower flat surface and extending upwardly, said circular groove being widest at its lower end or mouth and tapering to its top, which is about half way through the ring, the beveled surface being outside of said circular groove.

7. A doughnut-forming die assembly comprising, in combination, a power-reciprocated sleeve having on its lower end a circular knife edge for cutting dough; a hollow dough-discharging tube on which said sleeve reciprocates; a stem fixed to lie axially of said tube and extending below the lower discharge end of said tube; and a disk fixed to the lower end of said stem and lying generally at right angles to the longitudinal axis of said stem; said disk having a flexible elastomeric periphery making direct wiping contact first with the knife edge, then with the inner surface of said sleeve, when said sleeve is moved down to cut off a doughnut dough shape.

References Cited in the file of this patent

UNITED STATES PATENTS

| | | |
|---|---|---|
| 1,786,596 | Bissell | Dec. 30, 1930 |
| 2,011,740 | Vallendor et al. | Aug. 20, 1935 |
| 2,197,455 | Volpin | Apr. 16, 1940 |
| 2,273,693 | Burks | Feb. 17, 1942 |
| 2,405,903 | Premas | Aug. 13, 1946 |
| 2,669,949 | Cottingham | Feb. 23, 1954 |